Jan. 24, 1967          D. F. MITCHELL          3,300,051
FILTER TUBE FOR USE IN A CENTRIFUGE
Filed Sept. 26, 1963
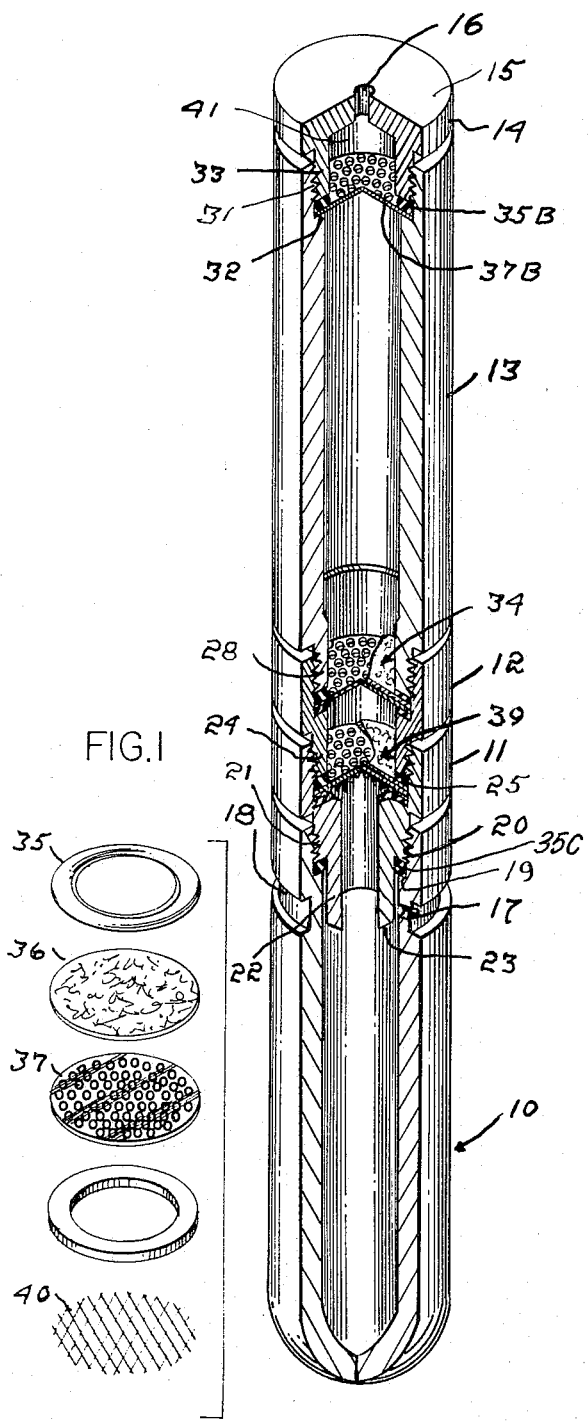
FIG.1
FIG.5
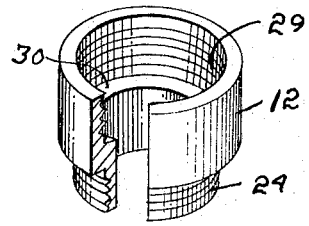
FIG.2
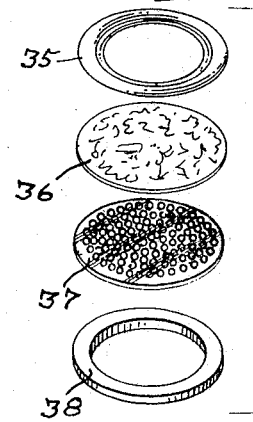
FIG.4
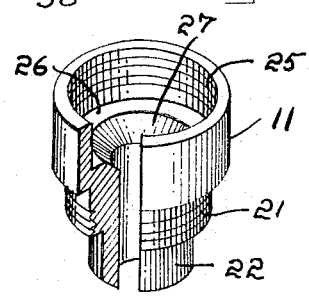
FIG.3
INVENTOR
DAVID F. MITCHELL
BY
ATTORNEY United States Patent Office 3,300,051
Patented Jan. 24, 1967

3,300,051
FILTER TUBE FOR USE IN A CENTRIFUGE
David F. Mitchell, Tewksbury, Mass., assignor to International Equipment Co., Needham Heights, Mass., a corporation of Massachusetts
Filed Sept. 26, 1963, Ser. No. 311,731
8 Claims. (Cl. 210—339)

The present invention relates to filter tubes for use in centrifuges.

It is a common practice in laboratories for filtration to be effected by manually applying pressure as by a pump or, more commonly, as by a syringe, to a body of liquid to force it through the filter. This procedure is objectionable in that it takes a substantial amount of time and effort and cannot ensure uniformity and, additionally, there is the risk with manual procedures, of spray-back which may contain harmful virus. In any event, the available equipment that is presently used makes it difficult to avoid contamination of the filtration and is not variable to meet varying demands.

The objective of the present invention is to provide tubes for use in centrifuges, the tubes containing filters with the number and characteristics of the filters being variable to meet a wide range of filtering requirements and with the filter tubes minimizing the risk of contamination of the filtration and, when desired, the intake and exhaust air.

In accordance with the invention, this objective is attained by providing a filter tube comprising a receiver section and a reservoir section with at least one filter section between them. The outlet ends of the filter and reservoir sections are of reduced diameter and are threaded with the proximate ends of the receiver and filter sections being of increased diameter and threaded to receive them and to provide internal annular shoulders. A filtering and sealing unit is clamped between each such shoulder and the appropriate outlet portion, save that, preferably between the receiver section and the proximate filter section. The receiver section has a vent opening through its side wall and, preferably, the outlet portion that is threaded into the receiver section has an end fitting freely therein and extending beyond the vent.

By substituting different filter units and by varying the number of filter sections, a filter tube in accordance with the invention is adapted to meet a wide range of filtering requirements since the forces applied to the materials to be filtered are effectively applied and accurately controlled in centrifuges with the result that many filtration problems can be met with substantially increased ease and accuracy.

In the accompanying drawings, there is shown an illustrative embodiment of the invention.

In the drawings:

FIGURE 1 is a partly sectioned, side elevation of a filter tube in accordance with the invention, the tube being shown on an increased scale, FIGURE 2 is a partly sectioned, perspective view of one of the filter sections, FIGURE 3 is a partly sectioned, perspective view of another of the filter sections, FIGURE 4 is an exploded view of the components of a filtering and sealing unit used therewith, and FIGURE 5 is an exploded view of the components of another filtering and sealing unit used therewith.

The filter tube shown in the drawings consists of a receiver section 10, a first filter section 11, a second filter section 12, a reservoir section 13, and a cap section 14. All of the sections are of the same outside diameter and tubular with the cap section 14 having an end wall 15 provided with an air inlet 16.

The receiver section 10 has a vent 17 opening into an annular groove 18. The open end of the section 10 is of increased inside diameter to provide a shoulder 19 and is threaded as at 20 to receive the threaded portion 21 of the filter section 11, the portion 21 being of reduced diameter and having an end 22 dimensioned to fit freely within the receiver section 10 and to extend beyond the vent 17 with its extremity 23 tapering inwardly and forwardly.

The filter section 12 has a threaded portion 24 of reduced diameter for entry into the threaded portion 25 of the filter section 11, the inside diameter of which being increased for that purpose to provide a shoulder 26. As the inside diameter of the filter section 12 is greater than that of the filter section 11, due to the fact that the latter has its end 22 extending within the receiver section 10, the proximal end of its bore tapers upwardly and outwardly as at 27.

The reservoir section 13 has a threaded portion 28 of reduced diameter for entry into the threaded portion end 29 of the filter section 12 whose inside diameter is such that it establishes a seat 30. At its other end, the reservoir section 13 is of increased inside diameter and threaded as at 31 defining an internal annular shoulder 32 and the tubular portion 33 of the cap 14 is threaded for entry into the threaded reservoir portion 31.

The corresponding threaded portions of the several sections are such that the threaded outlet end of any section can be threaded into the proximal threaded end portion of any other section and there may be a plurality of filter sections 12.

Between each two sections there are sealing and filtering units, between the sections 12 and 13 being generally indicated at 34 in FIGURE 1 and shown in FIGURE 4 as comprising an O-ring 35, a membrane 36, a support in the form of a perforated disc 37 and a shoulder-engaging washer 38. In the event that a plurality of filter sections 12 are employed, the units 34 would usually differ but only with respect to the size of the particles each would pass through its membrane.

The sealing and filtering unit between the receiver section 10 and the filter section 11 is generally indicated at 39 and in addition to the elements of which the unit 34 is composed and to the difference in the size of the particles it will pass, the unit 39 includes a reinforcing layer 40 of screen cloth. Where relatively high centrifuge speeds are used, the layer 40 prevents the unit 39 from so engaging the taper 27 as to prevent liquid flow through that part of the unit. The layer 40 can, accordingly, be omitted when low centrifuge speeds are used to effect filtration.

Between the reservoir section 13 and the cap section 14, only a perforated disc 37B and an O-ring 35B are shown. The space 41 between the disc 37B and the end wall 15 may be used for cotton or other filtering media if filtration of the inlet air is desired.

Between the receiver 10 and the filter section 11, there is an O-ring seal 35C and an important feature of the invention is that, with no filtering media between these sections, the chances of contaminating the filtration are minimized. In addition, the annular groove 18 provides a channel in which filtering media may be secured if filtration of the exhaust air is desired.

I claim:

1. A filter tube for use in a centrifuge, said tube comprising a receiver section, a reservoir section having an air inlet, and an intermediate filter section, the outlet ends of said filter and reservoir sections each including threaded portions of reduced diameter, the inlet ends of said receiver and filter sections being of increased inside diameter and threaded to receive the appropriate threaded portion and to provide an internal, annular shoulder, said receiver section being closed at its bottom end and having a laterally opening vent adjacent its shoulder, and a filtering and sealing unit clamped against said filter section shoulder by the appropriate outlet portion.

2. The filter tube of claim 1 in which all of the sections are of the same outside diameter and the receiver section has an external annular groove into which the vent opens.

3. The filter tube of claim 1 in which each filtering and sealing unit includes an O-ring, a washer, a membrane, and a perforated disc supporting membrane.

4. A filter tube for use in a centrifuge, said tube comprising a receiver section, a reservoir section having an air inlet, and an intermediate filter section, the outlet ends of said filter and reservoir sections each including threaded portions of reduced diameter, the outlet end of said filter section also including an end portion whose diameter is less than that of said receiver section, the inlet ends of said receiver and filter sections being of increased inside diameter and threaded to receive the appropriate threaded portion and to provide an internal, annular shoulder, said receiver section being closed at its bottom end and having a laterally opening vent adjacent its shoulder, said end of said filter section extending beyond said vent, and a filtering and sealing unit clamped against said filter section shoulder by the appropriate outlet portion.

5. The filter tube of claim 4 in which the inlet end of the passage through the filter section tapers downwardly and inwardly and the filtering and sealing means includes an underlying layer of screen cloth.

6. A filter tube for use in a centrifuge, said tube comprising a receiver section, a reservoir section having an air inlet and at least two intermediate filter sections, the outlet ends of said filter and reservoir sections each including threaded portions of reduced diameter, the outlet end of the filter section that is proximate to the receiver section also including an end portion dimensioned to fit freely and extend into said receiver section, the inlet ends of said receiver and filter sections being of increased inside diameter and threaded to receive the appropriate threaded portion and to provide an internal, annular shoulder, said receiver section being closed at its bottom end and having a laterally opening vent adjacent its shoulder beyond which said filter end portion extends, and a filtering and sealing unit clamped against each filter shoulder by the appropriate outlet portion.

7. A filter tube for use in a centrifuge, said tube comprising a receiver section, a reservoir section, a cap section having an air inlet, and at least two filter sections between said receiver and reservoir sections, the outlet ends of said filter, reservoir, and cap sections each including threaded portions of reduced diameter, the outlet end of the filter section that is proximate to the receiver section also including an end portion dimensioned to fit freely and extend into said receiver section, the inlet ends of said receiver, filter, and reservoir sections being of increased inside diameter and threaded to receive the appropriate threaded portion and to provide an internal annular shoulder, said receiver section being closed at its bottom end and having a laterally opening vent adjacent its shoulder beyond which said filter end portion extends, and a filtering and sealing unit clamped against each filter and said reservoir shoulder by the appropriate outlet portion.

8. A filter tube for use in a centrifuge, said tube comprising a receiver section, a reservoir section, a cap section having an air inlet, and at least two filter sections between said receiver and reservoir sections, the outlet ends of said filter, reservoir, and cap sections each including threaded portions of reduced diameter, the inlet ends of said receiver, filter, and reservoir sections being of increased inside diameter and threaded to receive the appriate threaded portion and to provide an internal annular shoulder, said receiver section having a closed bottom end and having a laterally opening vent adjacent its shoulder and a filtering and sealing unit clamped against each filter and said reservoir shoulder by the appropriate outlet portion.

References Cited by the Examiner

UNITED STATES PATENTS

| | | | |
|---|---|---|---|
| 565,890 | 8/1896 | Fowler | 210—339 |
| 604,931 | 5/1898 | Eisendrath | 210—489 X |
| 2,073,991 | 3/1937 | Koser | 210—489 X |
| 2,854,143 | 9/1958 | Novak | 210—361 X |

SAMIH N. ZAHARNA, *Primary Examiner.*

REUBEN FRIEDMAN, *Examiner.*

F. SPEAR, *Assistant Examiner.*